United States Patent [19]

Kobayashi

[11] Patent Number: 5,504,175

[45] Date of Patent: Apr. 2, 1996

[54] METHOD FOR MANUFACTURING AN ORGANOSILICON POLYMER WITH DOUBLE-ENDED FUNCTIONALITY

[75] Inventor: Hideki Kobayashi, Chiba, Japan

[73] Assignee: Dow Corning Toray Silicone Co., Ltd., Tokyo, Japan

[21] Appl. No.: 428,599

[22] Filed: Apr. 25, 1995

[30] Foreign Application Priority Data

Apr. 28, 1994 [JP] Japan .................................. 6-113952

[51] Int. Cl.$^6$ .................................................. C08G 77/08
[52] U.S. Cl. ................................ 528/15; 528/35; 525/478
[58] Field of Search .......................... 528/15, 35; 525/478

[56] References Cited

U.S. PATENT DOCUMENTS

| | | | |
|---|---|---|---|
| 5,087,720 | 2/1992 | Kishita et al. | 556/434 |
| 5,117,025 | 5/1992 | Takago et al. | 556/434 |

FOREIGN PATENT DOCUMENTS

| | | |
|---|---|---|
| 3144627 | 5/1983 | Germany . |
| 4065429 | 3/1992 | Japan . |
| 4065428 | 3/1992 | Japan . |

OTHER PUBLICATIONS

Izvestiya Akademii Nauk SSSR, Seriy a Kimicheskaya (English Abstract) vol. No. 4 pp. 739–744 (Apr. 1971).

*Primary Examiner*—Melvyn I. Marquis
*Attorney, Agent, or Firm*—Roger H. Borrousch

[57] ABSTRACT

A method for manufacturing, with high yield and without accompanying depolymerization, an organosilicon polymer with double-ended functionality which contains a bond between a silicon atom and a hydrogen atom or an alkenyl group at both ends of the molecular chain. The organosilicon polymer with double-ended functionality is expressed by the general formula:

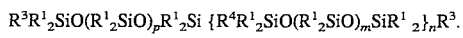

$R^3R^1{}_2SiO(R^1{}_2SiO)_pR^1{}_2Si\{R^4R^1{}_2SiO(R^1{}_2SiO)_mSiR^1{}_2\}_nR^3$.

wherein $R^1$ is a $C_{1-10}$ monovalent hydrocarbon group that does not contain an aliphatic unsaturated bond, $R^2$ is a $C_{2-10}$ alkenyl group, $R^3$ in the same molecule is either only a hydrogen atom or only a $C_{2-10}$ alkenyl group, $R^4$ is a $C_{2-10}$ alkylene group, m is an integer equal to or greater than 0, n is a positive integer and p is an integer equal to or greater than 0. This method is an addition polymerization of a diorganosiloxane expressed by the general formula

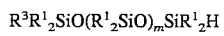

$R^3R^1{}_2SiO(R^1{}_2SiO)_mSiR^1{}_2H$ and a diorganosiloxane expressed by the general formula:

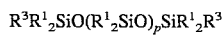

$R^3R^1{}_2SiO(R^1{}_2SiO)_pSiR^1{}_2R^3$ in the presence of a catalyst for producing a hydrosilylation.

10 Claims, 3 Drawing Sheets

METHOD FOR MANUFACTURING AN ORGANOSILICON POLYMER WITH DOUBLE-ENDED FUNCTIONALITY

BACKGROUND OF THE INVENTION

1. Field of the Invention

The present invention relates in general to a method for manufacturing an organosilicon polymer containing a silalkylenesiloxane, and in particular to a method of manufacturing, with good yield and without accompanying depolymerization, an organosilicon polymer containing a silalkylenesiloxane as the principal chain, and possessing the same functionality at both ends.

2. Background Information

Because, when compared to dimethylpolysiloxane, organosilicon polymers containing a silalkylenesiloxane as expressed by the general formula ($-R_2Si-C_aH_{2a}-R_2SiO-$) where R is a monovalent hydrocarbon group and a is a positive integer, scission of the molecular chain by ionic material such as acid or alkali is more difficult, their utilization in specialized fields is being studied. Ring-opening polymerization manufacturing methods, which use cyclic silalkylenesiloxanes as the starting material for manufacturing organosilicon polymers containing this silalkylenesiloxane group, are known; see Izvestiya Akademii Nauk SSSR, Seriy a Khimicheskaya, No. 4, 739–744, April, 1971, Japanese Kokai Patent Application Nos. Hei 4 [1992]-65428 (also U.S. Pat. No. 5,087,720, issued Feb. 11, 1992, to Kishita et al) and Hei 4 [1992]-65429 (also U.S. Pat. No. 5,117,025, issued May 26, 1992, to Takago et al).

However, these manufacturing methods require the use of a cyclic silalkylenesiloxane, such as 2,2,6,6-tetramethyl-1-oxa-2,6-disilacyclohexane and the like, as the starting material, which compounds are difficult to synthesize at high cost. In addition, these methods, as reported in Izvestiya Akademii Nauk SSSR above, have the drawback of not being able to produce a high yield of the objective organosilicon polymer containing the silalkylenesiloxane group because a part of the polysilalkylenesiloxane tends to depolymerize.

Along with these methods, there is a method for obtaining a silethylenesiloxane of low molecular weight and single-ended functionality from 1,1,3,3-tetramethyl-1-vinyldisiloxane and pentamethyldisiloxane separately (see West German Laid-open Patent Application No. 3,144,627); however, a silethylenesiloxane having the same functionality on both ends has not been offered.

PROBLEMS TO BE SOLVED BY THE INVENTION

The inventors of the present invention have attained results through painstaking study which have solved the aforementioned problems.

Specifically, the objective of the present invention is to offer a method for manufacturing, without depolymerization and with good yield, an organosilicon polymer containing a silalkylenesiloxane as the primary chain and having the same functionality on both ends.

SUMMARY OF THE INVENTION

Means to solve the problems and effect

This invention relates to a method for manufacturing an organosilicon polymer with double-ended functionality expressed by the general formula:

$$R^3R^1_2SiO(R^1_2SiO)_pR^1_2Si\{R^4R^1_2SiO(R^1_2SiO)_mSiR^1_2\}_nR^3$$

wherein $R^1$ is a $C_{1-10}$ monovalent hydrocarbon group that does not contain an aliphatic unsaturated bond, $R^4$ is a $C_{2-10}$ alkylene group, $R^3$ in the same molecule is either only a hydrogen atom or only a $C_{2-10}$ alkenyl group, p is an integer equal to or greater than 0, m is an integer equal to or greater than 0, and n is a positive integer, comprising polymerizing by additon reaction of (A) a diorganosiloxane expressed by the general formula $$R^2R^1_2SiO(R^1_2SiO)_mSiR^1_2H$$

wherein $R^1$ is a $C_{1-10}$ monovalent hydrocarbon group that does not contain any aliphatic unsaturated bonds, $R^2$ is a $C_{2-10}$ alkenyl group, and m is an integer equal to or greater than 0, and (B) a diorganosiloxane expressed by the general formula $$R^3R^1_2SiO(R^1_2SiO)_pSiR^1_2R^3$$

wherein $R^1$ is a $C_{1-10}$ monovalent hydrocarbon group that does not contain any aliphatic unsaturated bonds, $R^3$ in the same molecule is either only a hydrogen atom or only a $C_{2-10}$ alkenyl group, and is an integer equal to or greater than 0, in the presence of (C) a hydrosilylation catalyst.

DETAILED DESCRIPTION OF THE PREFERRED EMBODIMENTS

Figure 1:
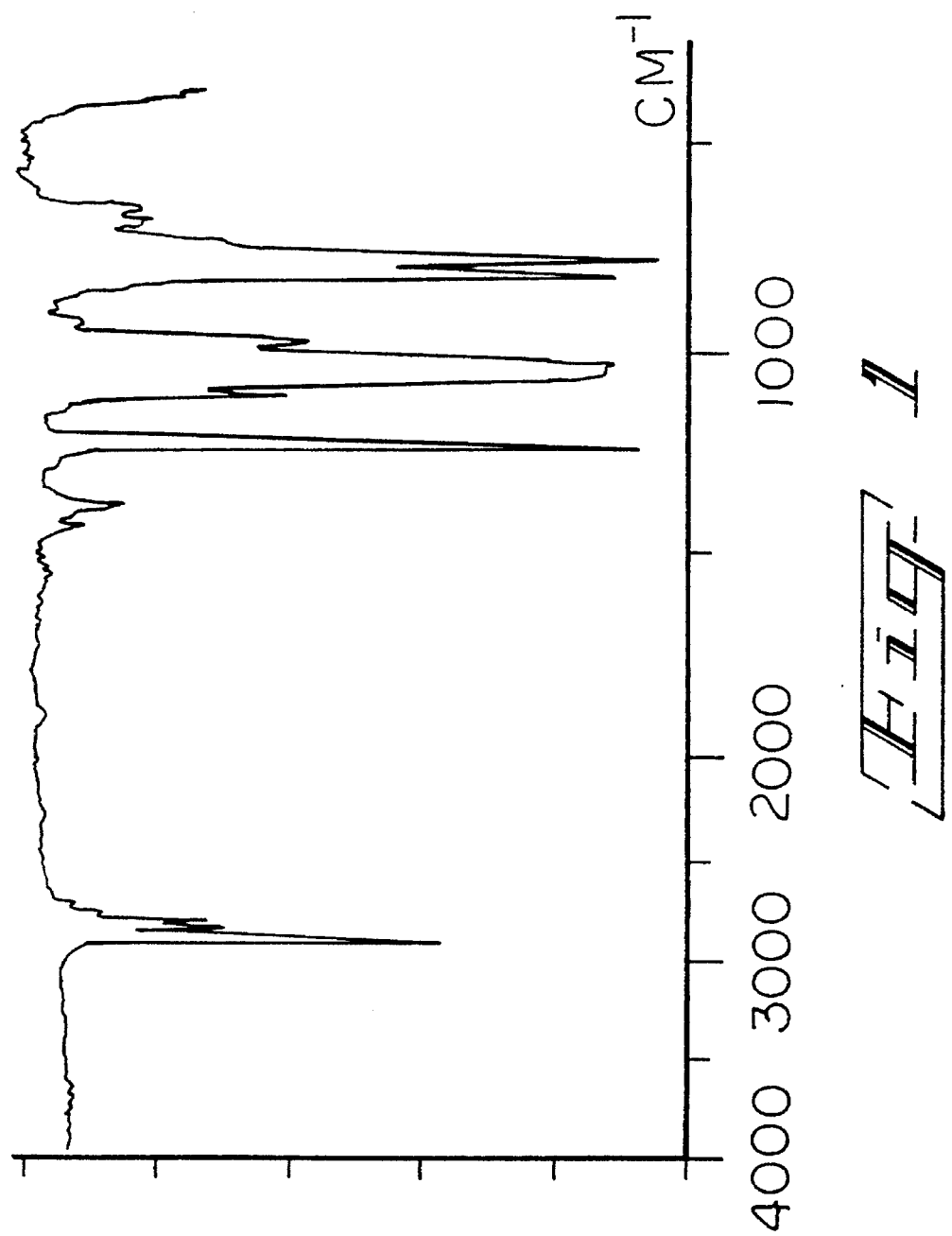
FIG. 1: A Fourier-transform infrared absorption spectrum of the organosilicon polymer manufactured in Example 1.

In the formula for component (A) of the present invention, $R^1$ is a monovalent $C_{1-10}$ hydrocarbon group that does not contain an aliphatic unsaturated bond and includes, for example, an alkyl group such as methyl, ethyl, propyl, butyl, pentyl, hexyl, heptyl, octyl, nonyl, or decyl; an aryl group, such as phenyl, tolyl, or xylyl; or an aralkyl group, such as a benzyl or phenethyl. Methyl and phenyl are preferred. $R^2$ is a $C_{2-10}$ alkenyl group and includes, for example, vinyl, allyl, butenyl, pentenyl, hexenyl, heptenyl, octenyl, nonenyl, or decenyl, among which vinyl or allyl is preferable.

Also in the formula for component (A), m is an integer greater than or equal to 0. When m is 0, the compound is a 1,1,3,3-tetraorganodisiloxane. There is no particular upper limit to the value of m; however, even though the top limit of m is not specifically defined when a diorganosiloxane with a value of m exceeding 10 is used, it becomes difficult to separate component (A), which has not reacted, from the organosilicon polymer with double-ended functionality which is the objective of the present invention, so it is preferable that m be an integer of 0–10.

The compounds shown in the chemical formulae which follow, are examples of diorganosiloxanes of component (A). In the compounds of these chemical formulae, Me represents methyl, Et represents ethyl, and Ph represents phenyl.

$(CH_2=CH)Me_2SiOSiMe_2H$, $(CH_2=CH)Et_2SiOSiEt_2H$, (CH$_2$=CH)MePhSiOSiMePhH, (CH$_2$=CHCH$_2$)Me$_2$SiOSiMe$_2$H, (CH$_2$=CHCH$_2$)Et$_2$SiOSiEt$_2$H, (CH$_2$=CHCH$_2$CH$_2$CH$_2$CH$_2$)MePhSiOSiMePhH, (CH$_2$=CH)Me$_2$SiO(Me$_2$SiO) SiMe$_2$H, (CH$_2$=CH)Et$_2$SiO(Et$_2$SiO) SiEt$_2$H, (CH$_2$=CH)Me$_2$SiO(MePhSiO) SiMe$_2$H, (CH$_2$=CH)Me$_2$SiO(Me$_2$SiO) $_2$SiMe$_2$H, (CH$_2$=CH)Et$_2$SiO(Et$_2$SiO) $_2$SiEt$_2$H, (CH$_2$=CH)Me$_2$SiO(MePhSiO) $_2$SiMe$_2$H, (CH$_2$=CHCH$_2$)Me$_2$SiO(Me$_2$SiO)$_2$SiMe$_2$H, (CH$_2$=CHCH$_2$)Et$_2$SiO(Et$_2$SiO)$_2$SiEt$_2$H, and (CH$_2$=CHCH$_2$CH$_2$CH$_2$CH$_2$)Me$_2$SiO(MePhSiO)$_2$-SiMe$_2$H.

The diorganopolysiloxanes of component (B) in the present invention function to cap the end of the organosilicon polymer diorganopolysiloxane of component (A), and, because of this, can control the degree of polymerization of an organosilicon polymer with double-ended functionality. In the formula defining component (B), R$^1$ is the same as defined above for component (A). Methyl and phenyl are prefered R$^1$. R$^3$ is hydrogen atom or a C$_{2-10}$ alkenyl group. Examples of alkenyl groups of R$^3$ are vinyl, allyl, butenyl, pentenyl, hexenyl, heptenyl, octenyl, nonenyl, and decenyl, among which vinyl and allyl are preferred. R$^3$ is preferably hydrogen, vinyl, or allyl. In component (B), R$^3$ is the same at both ends of the molecule. For example, R$^3$, at both terminals of a molecule of component (B), will be either a hydrogen atom or an alkenyl group.

In the formula for component (B), p is 0 or greater. If p is 0, component (B) is 1,1,3,3-tetraorganodisiloxane or 1,3-dialkenyltetraorganodisiloxane.

The compounds shown in the chemical formulaes which follow, exemplify diorganosiloxanes of component (B). In the compounds of these chemical formulae, Me represents methyl, Et represents ethyl, and Ph represents phenyl.

HMe$_2$SiOSiMe$_2$H, (CH$_2$=CH) Me$_2$SiOSiMe$_2$(CH=CH$_2$), (CH$_2$=CHCH$_2$)Me$_2$SiOSiMe$_2$(CH$_2$CH =CH$_2$), (CH$_2$=CHCH$_2$CH$_2$CH$_2$CH$_2$)Me$_2$SiOSiMe$_2$(CH$_2$CH$_2$-CH$_2$CH$_2$CH=CH$_2$),

HEt$_2$SiOSiEt$_2$H, (CH$_2$=CH) Et$_2$SiOSiEt$_2$(CH=CH$_2$), (CH$_2$=CHCH$_2$)MePhSiOSiPhMe (CH$_2$CH=CH$_2$),

HMe$_2$SiO(Me$_2$SiO)$_2$SiMe$_2$, (CH$_2$=CH)Me$_2$SiO(Me$_2$SiO)$_2$SiMe$_2$(CH=CH$_2$),

HMe$_2$SiO(MePhSiO)$_2$SiMe$_2$H, (CH$_2$=CH)Me$_2$SiO(MePhSiO)$_2$SiMe$_2$(CH=CH$_2$), (CH$_2$=CHCH$_2$)Me$_2$SiO(MePhSiO)$_2$SiMe$_2$(CH$_2$CH=CH$_2$), and (CH$_2$=CHCH$_2$CH$_2$CH$_2$CH$_2$)Me$_2$SiO(MePhSiO)$_2$SiMe$_2$-(CH$_2$CH$_2$CH$_2$CH$_2$CH=CH$_2$) .

The amount of component (B) added is not particularly limited; however, in order to obtain the desired degree of polymerization of the organosilicon polymer, it is desirable to control the molar ratio of component (B) to component (A). As the molar ratio is decreased the degree of polymerization increases and a higher molecular weight organosilicon polymer is obtained, and as the molar ratio is increased the degree of polymerization decreases and a lower molecular weight organosilicon polymer is obtained.

Hydrosilylation catalyst (C) promotes an addition reaction between the hydrogen atom in a molecule (A) and the alkenyl group in an other molecule (A), and also promotes an addition polymerization to manufacture an organosilicon polymer with double-ended functionality.

Examples of catalysts of component (C) include platinum catalysts, rhodium catalysts, palladium catalysts and organic peroxides. Of these, the platinum catalysts are preferable, specifically, platinum black, silica powder containing platinum, carbon powder containing platinum, chloroplatinic acid, an alcoholic solution of chloroplatinic acid, a complex of platinum and vinylsiloxane, or a complex of platinum and an olefin.

The amount of component (C) added is normally in a range of 0.1–500 parts by weight per million parts by weight based on the total weight of components (A) and (B).

The manufacturing method of the present invention is an addition polymerization of components (A) and (B) in the presence of component (C); however, it is optional to change the order in which components (A)–(C) are added. Examples of the methods comprising the present invention include (I) the method in which component (B) is gradually added to the mixture of components (A) and (C) while said mixture is heated and agitated, (II) the method in which component (A) is gradually added to the mixture of components (B) and (C) while said mixture is heated and agitated, (III) the method in which component (C) is gradually added to the mixture of components (A) and (B) while said mixture is heated and agitated, and (IV) the method in which the mixture of all the components (A), (B) and (C) are heated and agitated.

The manufacturing method of the present invention can comprise the use of organic solvents to the extent that the objectives of the present invention are not lost. When an organic solvent was used, organosilicon polymers with double-ended functionality of higher molecular weight could be manufactured. Specific examples of materials that can be used as organic solvents include the aromatic hydrocarbon solvents toluene, xylene and the like; the aliphatic hydrocarbon solvents hexane, heptane, octane, nonane and the like; the alicylic hydrocarbon solvents cyclohexane, cycloheptane, cyclooctane, and the like; and the aromatic hydrocarbons containing a fluoride atom such as trifluoromethylbenzene, 1,3-bis(trifluoromethyl)benzene and the like.

The manufacturing conditions of the present invention are not particularly limited; when the addition polymerization is undertaken at normal pressure, the reaction temperature is from the boiling point of component (A) or (B) up to the boiling point of the organic solvent used. When the boiling points of component (A), component (B) and the organic solvent used are relatively low, it is possible to carry out addition polymerization under pressurization.

The organosilicon polymer with double-ended functionality obtained through the manufacturing method of the present invention described above is expressed by the formula $$R^3R^1{}_2SiO(R^1{}_2SiO)_pR^1{}_2Si\{R^4R^1{}_2SiO(R^1{}_2SiO)_mSiR^1{}_2\}_nR^3$$

In this formula, R$^1$ is a C$_{1-10}$ monovalent hydrocarbon group that does not contain aliphatic unsaturated bonds, specific examples of which are the groups mentioned above. R$^4$ is a linear or branched C$_{2-10}$ alkylene group specifically illustrated by ethylene, methylethylene, ethylethylene, propylethylene, butylethylene, propylene, butylene, 1-methylpropylene, pentylene, hexenylene, heptenylene, octenylene, nonenylene, and decenylene, where ethylene, propylene, butylene, and hexenylene are preferred. R$^3$ is a hydrogen atom, or C$_{2-10}$ alkenyl group. The alkenyl group of R$^3$ is specifically illustrated by vinyl, allyl, butenyl, pentenyl, hexenyl, heptenyl, octenyl, nonenyl, and decenyl. m is an integer equal to or greater than 0 and shows the degree of polymerization of the diorganosiloxane, n is a positive integer showing the degree of polymerization of the silethylenesiloxane, and p is number equal to or greater than 0. In the manufacturing method of the present invention, when m is 0, the organosilicon polymer obtained is a polysilalkylenesiloxane with double-ended functionality; when m is an integer equal to or greater than 1, the organosilicon polymer obtained is a silalkylenesiloxane-diorganosiloxane copolymer with double-ended functionality.

In the manufacturing method of the present invention, when $R^3$ of component (B) is a $C_{2-10}$ alkenyl group, both ends of the molecular chain of the resulting organosilicon polymer with double-ended functionality are alkenyl groups. When $R^3$ of component (B) is a hydrogen atom, both ends of the molecular chain of the resulting organosilicon polymer are hydrogen atoms.

The organosilicon polymer with double-ended functionality obtained through the manufacturing method of the present invention is a viscous liquid at room temperature and has the characteristics of low surface tension and a molecular chain that is not easily broken by such ionic material as acids and alkalis. These characteristics can be put to practical use as base oils for lubricants, defoaming agents or greases. It can also be utilized as a base polymer in organic-peroxide-cured silicone rubber compositions, addition-reaction-cured silicone rubber compositions, and condensation-reaction-cured silicone rubber compositions.

Furthermore, the organosilicon polymer with a silicon-hydrogen group at both ends of its molecular chain can be converted to another kind of organosilicon polymer by allowing it to react by an addition reaction with an alkene containing organic functional group. By commonly known methods, it is possible to make an organosilicon polymers containing a hydroxyl group at both ends of the molecular chain by hydrolysis of those organosilicon polymers having silicon-bonded hydrogen atoms at both ends. The organosilicon polymer containing an alkenyl group at both ends of the molecular chain can be used to make an organosilicon polymer containing an organic functional group at both ends of the molecular chain by reacting it with a silane containing a silicon-bonded hydrogen atom and the desired organic functional group by an addition reaction.

The inventive method of manufacturing the organosilicon polymers of the present invention is illustrated by the following examples. In these examples, the viscosity shown is that viscosity measured at 25° C., and Me represents methyl.

EXAMPLE 1

Figure 2:
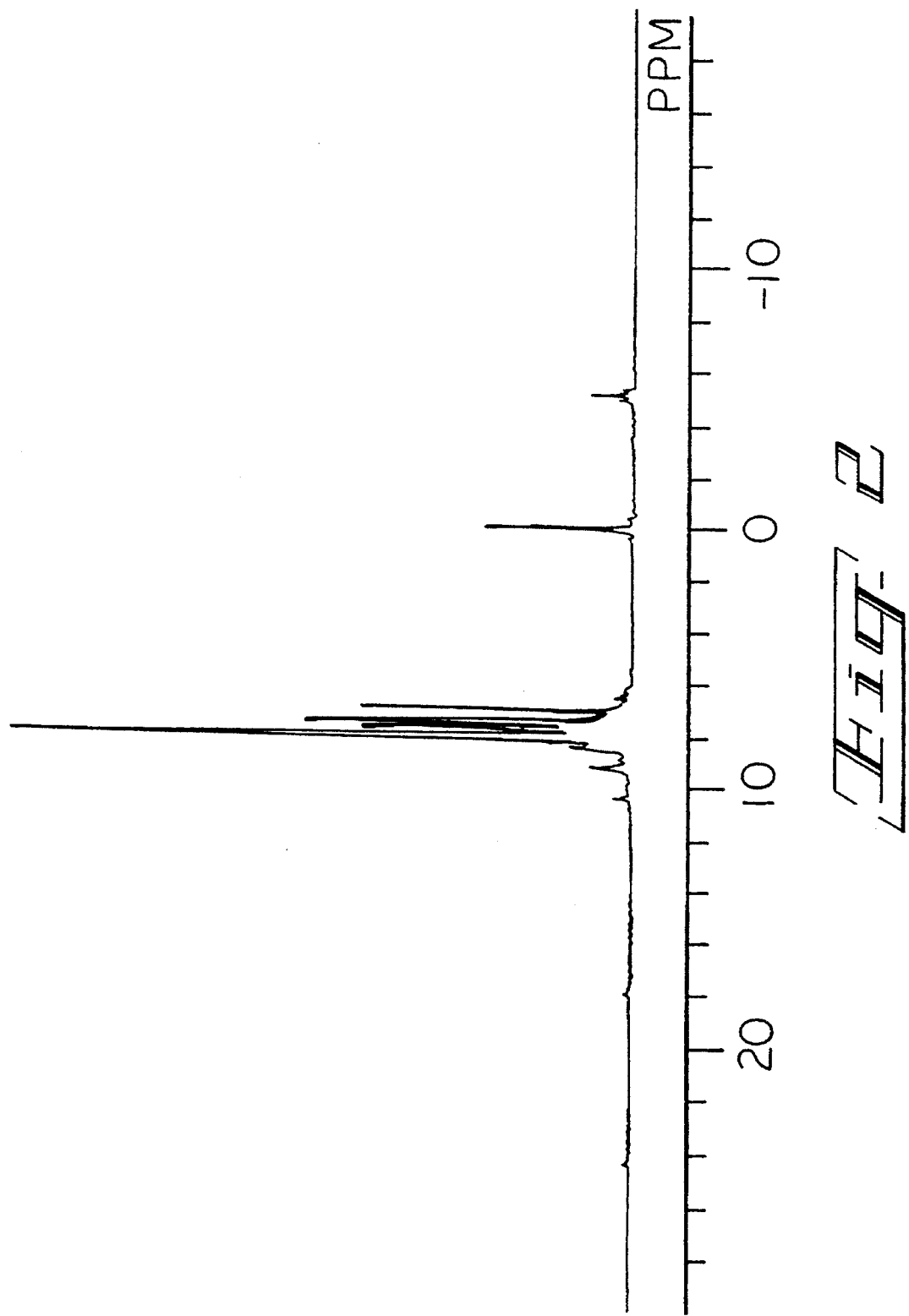
FIG. 2: A $^{29}Si$ NMR spectrum of the organosilicon polymer manufactured in Example 1.
Figure 3:
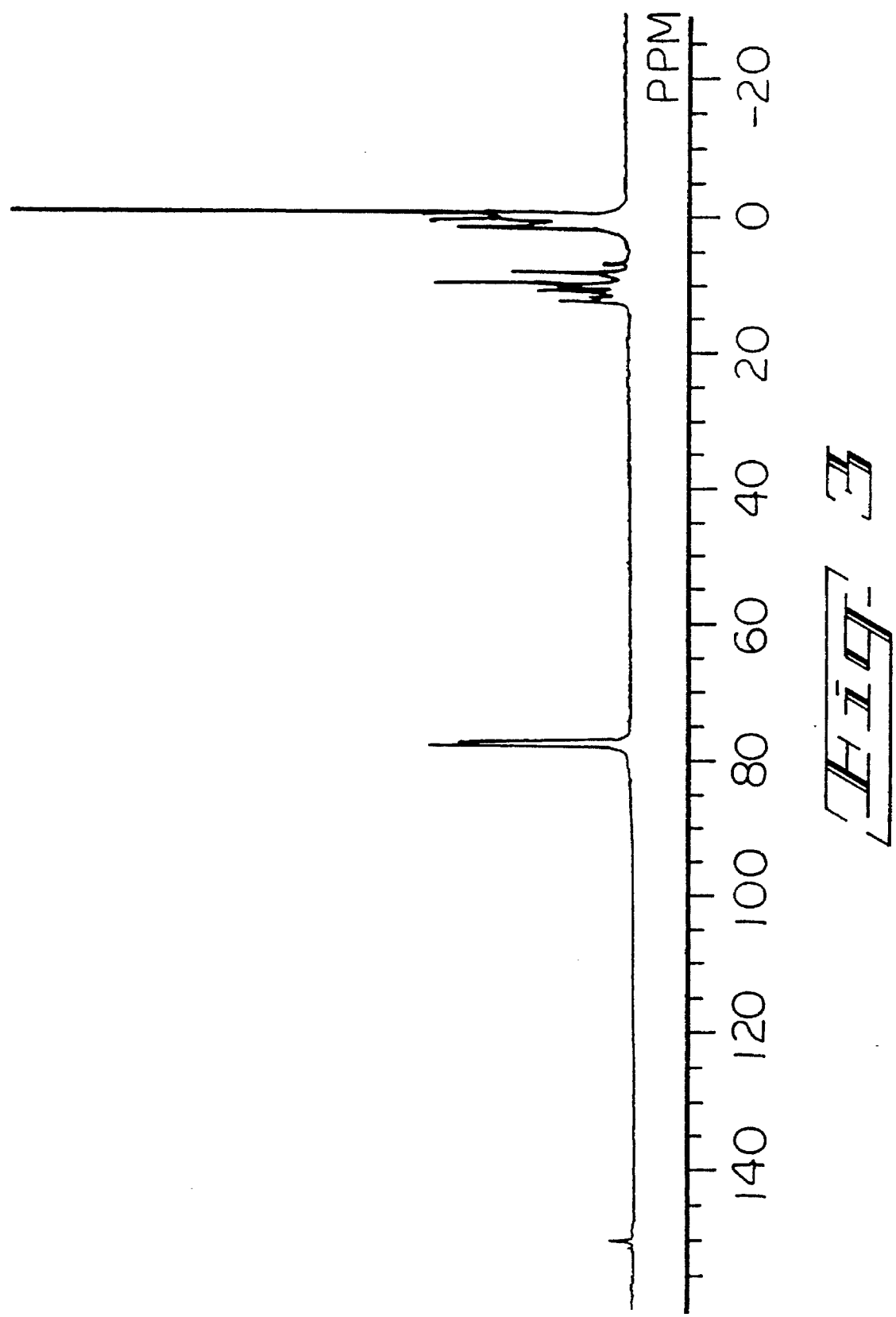
FIG. 3: A $^{13}C$ NMR spectrum of the organosilicon polymer manufactured in Example 1.

A toluene solution was prepared by introducing into a reaction vessel, 60 g of toluene, 1.86 g (0.01 mol) of 1,3-divinyltetramethyldisiloxane, and a solution of a complex of divinyltetramethyldisiloxane and chloroplatinic acid containing 1 g of carbon powder containing 0.5% platinum which solution was heated to 90° C. with uniform agitation. Then, 144 g (0.9 mol) of 1,1,3,3-tetramethyl-1-vinyldisiloxane were slowly added dropwise. After the dropwise addition was complete, the mixture was heated for 2 hours at 112° C. in a circulating air current. Following cold filtration, the toluene was extracted from the toluene solution, and a sticky liquid was obtained. Immediately after the extraction, this sticky liquid was analyzed by $^{29}$Si and $^{13}$C nuclear magnetic resonance spectral analysis (hereinafter, NMR) which determined it to be a polysilethylenedimethylsiloxane as expressed in the following formula:

where x had an average value of greater than 1 based on the weight-average molecular weight as determined by gel permeation chromatography (hereinafter, GPC). FIGS. 1, 2, and 3 were the results of analysts by Fourier-transform infrared absorption spectrum, $^{29}$Si NMR, and $^{13}$C NMR to identify the organosilicon polymer made by this method.

This polysilethylenedimethysiloxane was immediately analyzed by GPC. The weight-average molecular weight calculated by using polydimethylsiloxane was 5,000. The yield of polysilethylenesiloxane from this peak area was 84%.

EXAMPLE 2

A toluene solution was prepared by introducing into a reaction vessel, 60 g of toluene, 1.34 g (0.01 mol) of 1,1,3,3-tetramethyldisiloxane and chloroplatinic acid in 50% isopropanol in which the platinum metal content was 60 ppm which solution was heated to 60° C. with uniform agitation. Then, 128 g (0.8 mol) of 1,1,3,3-tetramethyl-1-vinyldisiloxane were slowly added dropwise. After dropwise addition was complete, the mixture was heated for 2 hours at 112° C. in a circulating air current. Following cold filtration, the toluene was extracted from the toluene solution and a sticky liquid was obtained. Immediately after extraction, this sticky liquid was analyzed by $^{29}$Si and $^{13}$C NMR, and was ascertained to be a polysilethylenedi-methylsiloxane as expressed in the following formula:

where x had an average value of greater than 1 based on the weight-average molecular weight as determined by GPC.

This polysilethylenedimethylsiloxane was immediately analyzed by GPC, and the weight-average molecular weight caluculated by using polydimethylsiloxane was 15,000. The yield of polysilethylenedimethylsiloxane from this peak area was 94%.

EXAMPLE 3

A toluene solution was prepared by introducing into a reaction vessel, 60 g of toluene, 2.14 g (0.01 mol) of 1,3-diallyltetramethyldisiloxane, and a solution of a complex of divinyltetramethyldisiloxane and chloroplatinic acid containing 1 g carbon powder containing 0.5% platinum which solution was heated to 90° C. with uniform agitation. Then, 122 g (0.7 mol) of 1,1,3,3-tetramethyl-1-allyldisiloxane were slowly added dropwise. After dropwise addition was complete, it was heated for 2 hours at 112° C. in a circulating current. Following cold filtration, the solvent was extracted from the toluene solution, and a sticky liquid was obtained. Immediately after extraction, this sticky liquid was analyzed by $^{29}$Si and $^{13}$C NMR, and was ascertained to be a polysilpropylenedimethylsiloxane as expressed in the following formula:

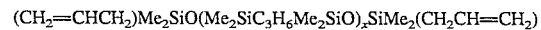

where x had an average value of greater than 1 based on the weight-average molecular weight as determined by GPC.

This polysilpropylenedimethysiloxane was immediately analyzed by GPC, and the weight-average molecular weight calculated by using polydimethylsiloxane was 9,000. The yield of polysilpropylenedimethylsiloxane from this peak area was 93%.

Effects of the invention

The manufacturing method of the present invention makes it possible to manufacture, with high yield and without accompanying depolymerization, an organosilicon polymer with double-ended functionality which has silalkylenesiloxane groups in its primary chain and the same functionality at both ends.

That which is claimed is:

1. A method for manufacturing an organosilicon polymer with double-ended functionality expressed by the general formula:

$$R^3R^1{}_2SiO(R^1{}_2SiO)_pR^1{}_2Si\{R^4R^1{}_2SiO)_mSiR^1{}_2\}_n R^3$$

wherein $R^1$ is a $C_{1-10}$ monovalent hydrocarbon group that does not contain an aliphatic unsaturated bond, $R^4$ is a $C_{2-10}$ alkylene group, $R^3$ in the same molecule is either only a hydrogen atom or only a $C_{2-10}$ alkenyl group, p is an integer equal to or greater than 0, m is an integer equal to or greater than 0, and E is a positive integer, comprising polymerizing by additon reaction of (A) a diorganosiloxane expressed by the general formula $$R^2R^1{}_2SiO(R^1{}_2SiO)_mSiR^1{}_2H$$

wherein $R^1$ is a $C_{1-10}$ monovalent hydrocarbon group that does not contain any aliphatic unsaturated bonds, $R^2$ is a $C_{2-10}$ alkenyl group, and m is an integer equal to or greater than 0, and (B) a diorganosiloxane expressed by the general formula $$R^3R^1{}_2SiO(R^1{}_2SiO)_pSiR^1{}_2R^3$$

wherein $R^1$ is a $C_{1-10}$ monovalent hydrocarbon group that does not contain any aliphatic unsaturated bonds, $R^3$ in the same molecule is either only a hydrogen atom or only a $C_{2-10}$ alkenyl group, and p is an integer equal to or greater than 0, in the presence of (C) a hydrosilylation catalyst.

2. The method according to claim 1 in which m has an average value of from 0 to 10.

3. The method according to claim 1 in which $R^1$ ms methyl or phenyl, $R^2$ ms vinyl or allyl, $R^3$ is hydrogen atom.

4. The method according to claim 1 in which $R^1$ is methyl or phenyl, $R^2$ is vinyl or allyl, $R^3$ is vinyl.

5. The method according to claim 1 in which $R^1$ is methyl or phenyl, $R^2$ is vinyl or allyl, $R^3$ is allyl.

6. The method according to claim 2 in which $R^1$ is methyl or phenyl, $R^2$ ms vinyl or allyl, $R^3$ is hydrogen atom.

7. The method according to claim 2 in which $R^1$ is methyl or phenyl, $R^2$ is vinyl or allyl, $R^3$ is vinyl.

8. The method according to claim 2 in which $R^1$ ms methyl or phenyl, $R^2$ is vinyl or allyl, $R^3$ is allyl.

9. The method according to claim 1 in which the hydrosilylation catalyst (C) is a platinum catalyst.

10. The method according to claim 2 in which the hydrosilylation catalyst (C) is a platinum catalyst.

* * * * *

UNITED STATES PATENT AND TRADEMARK OFFICE
CERTIFICATE OF CORRECTION

PATENT NO. : 5,504,175
DATED : April 2, 1996
INVENTOR(S) : Hideki Kobayashi

It is certified that error appears in the above-indentified patent and that said Letters Patent is hereby corrected as shown below:

Column 7, line 20, should read --$\underline{n}$ is a positive integer--.

Signed and Sealed this

Sixteenth Day of September, 1997

Attest:

BRUCE LEHMAN

*Attesting Officer*      *Commissioner of Patents and Trademarks*